(12) United States Patent
Locklair et al.

(10) Patent No.: US 9,416,037 B2
(45) Date of Patent: Aug. 16, 2016

(54) MIXING SYSTEMS AND METHODS OF MIXING

(71) Applicant: ENVIROMIX, LLC, Charleston, SC (US)

(72) Inventors: Robert Elliott Locklair, Summerville, SC (US); Theodore K. Jenkins, Charleston, SC (US)

(73) Assignee: EnviroMix, Inc., Charleston, SC (US)

( * ) Notice: Subject to any disclaimer, the term of this patent is extended or adjusted under 35 U.S.C. 154(b) by 55 days.

(21) Appl. No.: 14/198,346

(22) Filed: Mar. 5, 2014

(65) Prior Publication Data

US 2014/0183129 A1 Jul. 3, 2014

Related U.S. Application Data

(63) Continuation of application No. 13/591,495, filed on Aug. 22, 2012, now Pat. No. 8,702,070, which is a continuation of application No. 12/577,529, filed on Oct. 12, 2009, now Pat. No. 8,505,881.

(51) Int. Cl.
| | |
|---|---|
| *B01F 3/04* | (2006.01) |
| *C02F 11/02* | (2006.01) |
| *C02F 3/20* | (2006.01) |
| *B05B 1/00* | (2006.01) |

(52) U.S. Cl.
CPC ............... *C02F 11/02* (2013.01); *B01F 3/0412* (2013.01); *B01F 3/04106* (2013.01); *B01F 3/04248* (2013.01); *B05B 1/005* (2013.01); *C02F 3/20* (2013.01); *B01F 2003/04148* (2013.01); *B01F 2003/04177* (2013.01); *B01F 2003/04184* (2013.01); *B01F 2003/04312* (2013.01); *B01F 2003/04368* (2013.01); *B01F 2003/04872* (2013.01); *Y02W 10/15* (2015.05)

(58) Field of Classification Search
CPC ................... B01F 3/04; B01F 3/04106; B01F 2003/04184; B01F 2003/04283; B01F 2003/04312; B01F 3/04099
USPC ................................. 261/26, 121.1, 124, 126
See application file for complete search history.

(56) References Cited

U.S. PATENT DOCUMENTS

| | | | |
|---|---|---|---|
| 4,595,296 A | 6/1986 | Parks | |
| 5,133,876 A | 7/1992 | Tharp | |
| 5,304,308 A | 4/1994 | Tsumura et al. | |
| 5,482,630 A | 1/1996 | Lee et al. | |
| 5,536,409 A * | 7/1996 | Dunkers | B01D 21/0018 210/519 |

(Continued)

FOREIGN PATENT DOCUMENTS

| | | |
|---|---|---|
| EP | 1992946 A1 | 11/2008 |
| GB | 717464 A | 10/1954 |

(Continued)

OTHER PUBLICATIONS

Arnold, Ph.D., William A., "Phi-RPT-002; CFD Analysis of Large Bubble Mixing," ZIN Technologies, Phi Engineering Support, Jun. 26, 2006.

(Continued)

*Primary Examiner* — Robert A Hopkins
(74) *Attorney, Agent, or Firm* — Nelson Mullins Riley & Scarborough LLP (57) ABSTRACT

A system for mixing and mixing processes and structures are disclosed. In addition a nozzle used for mixing is disclosed.

12 Claims, 11 Drawing Sheets

(56) References Cited

U.S. PATENT DOCUMENTS

| | | | |
|---|---|---|---|
| 5,558,763 A * | 9/1996 | Funakoshi | B01D 21/0003 210/150 |
| 5,582,734 A | 12/1996 | Coleman et al. | |
| 5,624,565 A | 4/1997 | Lefevre et al. | |
| 5,639,373 A | 6/1997 | Mahendran et al. | |
| 5,733,456 A | 3/1998 | Okey et al. | |
| 5,783,083 A | 7/1998 | Henshaw et al. | |
| 5,910,250 A | 6/1999 | Mahendran et al. | |
| 5,989,428 A | 11/1999 | Goronszy | |
| 6,042,677 A | 3/2000 | Mahendran et al. | |
| 6,245,239 B1 | 6/2001 | Cote et al. | |
| 6,280,636 B1 | 8/2001 | Locklair | |
| 6,282,636 B1 | 8/2001 | Yeh et al. | |
| 6,294,039 B1 | 9/2001 | Mahendran et al. | |
| 6,350,747 B1 | 2/2002 | Glennon et al. | |
| 6,426,004 B1 | 7/2002 | Hiatt et al. | |
| 6,475,395 B1 | 11/2002 | Schmit et al. | |
| 6,550,747 B2 | 4/2003 | Rabie et al. | |
| 6,609,070 B1 | 8/2003 | Lueck | |
| 6,620,319 B2 | 9/2003 | Behmann et al. | |
| 6,629,773 B2 | 10/2003 | Parks | |
| 6,650,747 B1 | 11/2003 | Bala et al. | |
| 6,682,652 B2 | 1/2004 | Mahendran et al. | |
| 6,808,629 B2 | 10/2004 | Wouters-Wasiak et al. | |
| 6,863,810 B2 | 3/2005 | Chann | |
| 6,882,419 B2 | 4/2005 | Coleman et al. | |
| 6,964,741 B2 | 11/2005 | Mahendran et al. | |
| 7,282,141 B2 | 10/2007 | Koopmans et al. | |
| 7,374,675 B2 | 5/2008 | Koopmans et al. | |
| 7,396,453 B1 | 7/2008 | Probst | |
| 7,427,354 B2 | 9/2008 | Eto | |
| 7,476,322 B2 | 1/2009 | Dimitriou et al. | |
| 7,524,419 B2 | 4/2009 | Koopmans et al. | |
| 7,655,142 B2 | 2/2010 | Liu et al. | |
| 7,728,888 B2 | 6/2010 | Ono | |
| 7,763,173 B1 | 7/2010 | Koopmans et al. | |
| 8,323,498 B2 | 12/2012 | Jenkins et al. | |
| 8,505,881 B2 | 8/2013 | Locklair et al. | |
| 8,702,070 B2 | 4/2014 | Locklair et al. | |
| 2003/0006512 A1 | 1/2003 | Kelly | |
| 2003/0071377 A1 | 4/2003 | Tharp | |
| 2006/0131232 A1 | 6/2006 | Rosen et al. | |
| 2006/0163156 A1 | 7/2006 | Eto | |
| 2006/0254977 A1 | 11/2006 | Koopmans et al. | |
| 2006/0254979 A1 | 11/2006 | Koopmans et al. | |
| 2006/0254980 A1 | 11/2006 | Koopmans et al. | |
| 2007/0007214 A1 | 1/2007 | Zha et al. | |
| 2007/0108125 A1 | 5/2007 | Cho et al. | |
| 2008/0296229 A1 | 12/2008 | Yamasaki et al. | |
| 2010/0163484 A1 | 7/2010 | Cormier et al. | |
| 2010/0187173 A1 | 7/2010 | Lee et al. | |
| 2013/0003486 A1 | 1/2013 | Jenkins et al. | |
| 2015/0048026 A1 | 2/2015 | Jenkins et al. | |

FOREIGN PATENT DOCUMENTS

| | | |
|---|---|---|
| JP | 64-070198 A | 3/1989 |
| WO | 0021890 A1 | 4/2000 |
| WO | 2007008630 A2 | 1/2007 |
| WO | 2007038443 A2 | 4/2007 |
| WO | 2008046139 A1 | 4/2008 |
| WO | 2011046929 A2 | 4/2011 |

OTHER PUBLICATIONS

EPA (U.S. Environmental Protection Agency), Office of Wastewater Management. "Evaluation of Energy Conservation; Measures for Wastewater Treatment Facilities," EPA 632-R-10-005. Sep. 2010.
EPA, Environmental Protection Agency, "Wastewater Management Fact Sheet, Membrane Bioreactors," Sep. 2007.
Kippax, Victoria, "Importance of Air Scour in Membrane Bioreactor Systems," www.waterworld.com/index/display/article-display/3887904678/art-icles/membranes . . . (printed from internet Apr. 18, 2012).
PCT International Search Report and Written Opinion of the International Searching Authority for PCT Patent Application No. PCT/US2011/054809 mailed Jan. 5, 2012.
PCT International Search Report and Written Opinion for International Application No. PCT/US2010/052317 filed Dec. 10, 2010.
PCT International Search Report for PCT Patent Application No. PCT/US2010/052317 mailed May 11, 2011.
Phi Pulsed Hydraulics, Inc, Brochure, "Low Cost, Low Energy, Effective and Efficient Mixing," 008 Rev 9/10, (2010).
Wallis-Lage et al., Energy Efficient MBR Designs Can Significantly Reduce Operating Costs, Water Environment Federation, WEFTC 2010, pp. 5828-5838.
WE&T, "Using a phased nitrification and identification mode has enable the Bozeman, Mont., wastewater treatment plant to reduce . . . " WE&T www.wef.org/Magazine, Jul. 2010.
www.waterindustry.org/New%20Projects/zenon-sues-2.htm, "Zenon Files Suite Against US Filter Corporation," search late Mar. 2, 2011
*Zenon Environment, Inc. v. United States Filter Corporation*, "Order Construing Claims for U.S. Pat. No. 6,245,239," filed Nov. 9, 2004 in US District of California, Civil Action Case No. 03CV1996-B(AJB).
*Zenon Environmental, Inc. v. United States Filter Corporation*, "Order Granting in Part and Denying in Part United States Filter Corporation's Motion for Summary Judgment of Non-Infringement of the Asserted Claims of U.S. Pat. No. 6,620,319" filed Nov. 16, 2005 in US District Court, Southern District of California, Civil Action Case No. 03CV1996-B(AJB).
*Zenon Environmental, Inc. v. United States Filter Corporation*, "Order Granting Motion for Summary Judgment for NonInfringement of Claim 20 of U.S. Pat. No. 6,550,747" filed Feb. 24, 2005 in US District Court, Southern District of California, Civil Action Case No. 03CV1996-B(JFS).
*Zenon Environmental, Inc. v. United States Filter Corporation*, "Stipulation and Order thereon for Dismissal without Prejudice of Certain Claims Relating to U.S. Pat. No. 6,245,239 and U.S. Pat. No. 6,550,747," filed Nov. 2, 2005 in US District Court, Southern District of California, Civil Action Case No. 03CV1996-B(AJB).
*Zenon Environmental, Inc. v. United States Filter Corporation*, now known as Water Applications & Systems corporation, "Order Denying Defendant United States Filter Corporation's Motion for Summary Judgment of Invalidity and Non-Infringement of Asserted Claims 1-3 of U.S. Pat. No. 6,245,239," filed Mar. 14, 2005 in US District Court, Southern District of California, Civil Action Case No. 03CV1996-B(AJB).
*Zenon Environmental, Inc. v. United States Filter Corporation*, now known as Water Applications & Systems corporation, "Order Denying Defendant United States Filter Corporation's Motion for Summary Judgment of Invalidity of Asserted Claim 7 of U.S. Pat. No. 6,620,319," filed Mar. 14, 2005 in US District Court, Southern District of California, Civil Action Case No. 03CV1996-B(AJB).
*Zenon Environmental, Inc., Plaintiff-Cross Appellant v. United States Filter Corporation* (now known as Water Applications & Systems Corporation), Defendant-Appellant, Opinion decided Nov. 7, 2007 in US Court of Appeals for the Federal Circuit 2006-1266, -1267, Civil Action Case No. 03CV1996-B(AJB).
Zhang et al., "Simultaneous nitrification and denitrification in activated sludge system under low oxygen concentration," Front. Environ. Sci. Engin. China, 2007, 1(1):49-52.
U.S. Office Action dated Aug. 24, 2012 issued in U.S. Appl. No. 12/577,529.
Response filed Jan. 24, 2013 to U.S. Office Action dated Aug. 24, 2012 issued in U.S. Appl. No. 12/577,529.
U.S. Office Action dated Jun. 26, 2012 issued in U.S. Appl. No. 13/252,905.
Response tiled Sep. 26, 2012 to U.S. Office Action dated Jun. 26, 2012 issued in U.S. Appl. No. 13/252,905.
U.S. Office Action dated Nov. 8, 2012 issued in U.S. Appl. No. 13/591,495.
Response filed May 8, 2013 to U.S. Office Action dated Nov. 8, 2012 issued in U.S. Appl. No. 13/591,495.
U.S. Office Action dated May 17, 2013 issued in U.S. Appl. No. 13/591,495.

(56) References Cited

OTHER PUBLICATIONS

Response filed Nov. 8, 2013 to U.S. Office Action dated May 17, 2013 issued in U.S. Appl. No. 13/591,495.
U.S. Office Action dated Dec. 18, 2012 issued in U.S. Appl. No. 13/591,509.
Response filed Jun. 18, 2013 to U.S. Office Action dated Dec. 18, 2012 issued in U.S. Appl. No. 13/591,509.
U.S. Office Action dated Jul. 3, 2013 issued in U.S. Appl. No. 13/591,509.
U.S. Office Action dated Feb. 13, 2015 issued in U.S. Appl. No. 14/147,209.
Response filed Jun. 11, 2015 to U.S. Office Action dated Feb. 13, 2015 issued in U.S. Appl. No. 14/147,209.
U.S. Office Action dated Aug. 13, 2015 issued in U.S. Appl. No. 14/147,209.
Response filed Dec. 14, 2015 to U.S. Office Action dated Aug. 13, 2015 issued in U.S. Appl. No. 14/147,209.

\* cited by examiner

MIXING SYSTEMS AND METHODS OF MIXING

CROSS-REFERENCE TO RELATED APPLICATIONS

This application is a continuation of U.S. application Ser. No. 13/591,495, filed Aug. 22, 2012 now U.S. Pat. No. 8,702,070 and U.S. application Ser. No. 12/577,529, filed Oct. 12, 2009 now U.S. Pat. No. 8,505,881, which is hereby incorporated by reference in its entirety.

FIELD OF THE INVENTION

The present invention relates to mixing systems, methods, and components used for mixing fluids, and particularly fluids at wastewater treatment facilities.

BACKGROUND

Methods and systems for treating wastewater are known in the art. Such methods may include aerobic, anoxic, and anaerobic processes.

SUMMARY OF THE INVENTION

The present invention includes a mixing system for mixing fluids. The mixing system may be used for mixing wastewater in a wastewater treatment containment unit. The system includes a source of compressed air connected to a supply line; a valve between the source of compressed air and a supply header; a first line connected to the header; and a nozzle located inside a containment unit, wherein the nozzle is connected to the first line and wherein the nozzle comprises two outlets.

The present invention further includes a nozzle for use in a mixing system with the nozzle having a nipple interconnected to a structure forming or capable of forming a partially enclosed channel, and the channel having at least two outlets.

The present invention also includes a process for mixing including introducing an intermittent and controlled burst of pressurized gas from a nozzle into a containment unit. In the process, multiple mixing bubbles of varying sizes are formed by the burst, and at least two pluralities of mixing bubbles are introduced nearly simultaneously from a single nozzle.

The present invention may be better understood by reference to the description and figures that follow. It is to be understood that the invention is not limited in its application to the specific details as set forth in the following description and figures. The invention is capable of other embodiments and of being practiced or carried out in various ways.

BRIEF DESCRIPTION OF THE DRAWINGS

These and other features, aspects, and advantages of the present invention are better understood when the following detailed description is read with reference to the accompanying drawings, wherein.

Repeat use of reference characters in the present specification and drawings is intended to represent same or analogous features or elements of the invention.

DETAILED DESCRIPTION OF EXEMPLARY EMBODIMENTS

Reference will now be made in detail to various embodiments of the invention, one or more examples of which are illustrated in the accompanying drawings. Each example is provided by way of explanation, not limitation, of the invention. In fact, it will be apparent to those skilled in the art that modifications and variations can be made in the present invention without departing from the scope and spirit thereof. For instance, features illustrated or described as part of one embodiment may be used on other embodiment to yield a still further embodiment. Thus, it is intended that the present invention covers such modifications and variations as come within the scope of the appended claims and their equivalents.

Figure 1:
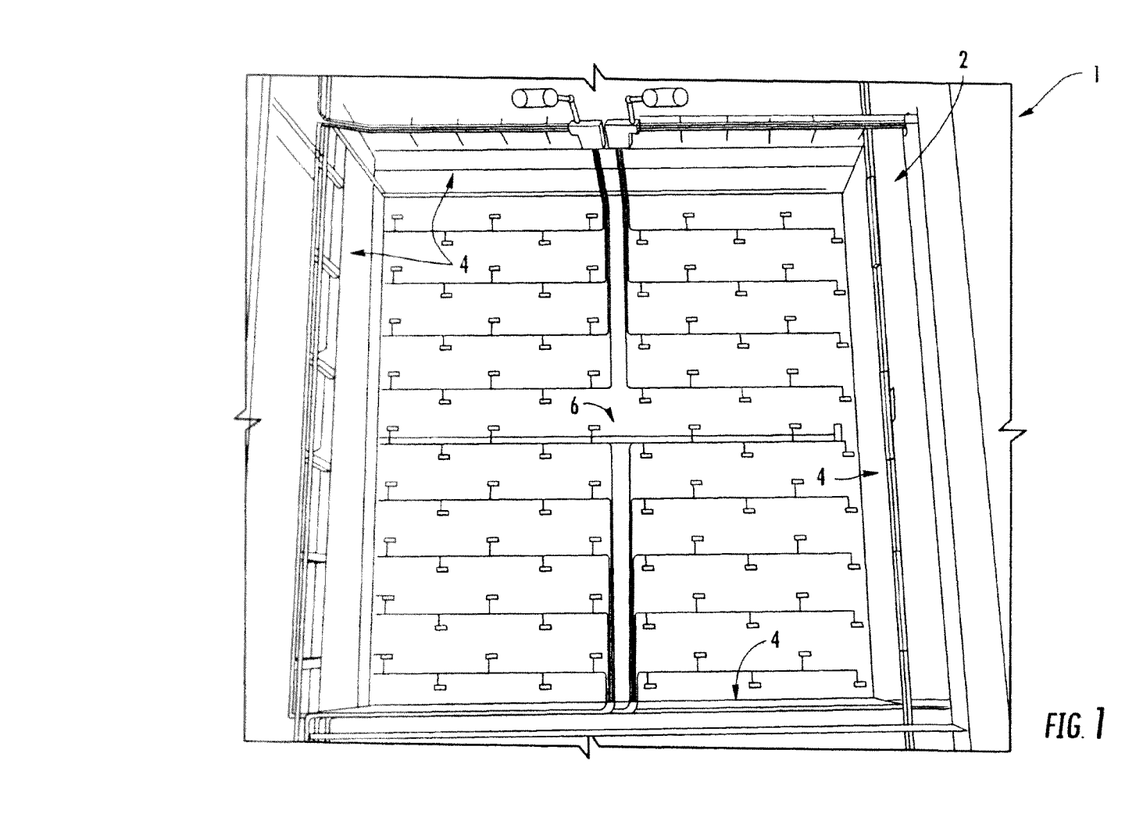
FIG. 1 is an overhead perspective view of a mixing system in accordance with an embodiment of the present invention.

Referring to FIG. 1, an overhead perspective view of an exemplary wastewater treatment mixing system 1 is shown. The system 1 includes a containment unit for wastewater, which is shown in FIG. 1 as basin 2 having four sidewalls 4 and a bottom 6. One of ordinary skill in the art will appreciate that alternative types of containment units, such as tanks or vessels, are also within the scope of the present invention. The containment unit may additionally have an inlet through which wastewater enters and an outlet through which the treated wastewater exits. In some embodiments, the containment unit may allow for continuous flow of the wastewater whereas other embodiments may restrict the flow of the wastewater. In some embodiments, multiple containment units, of the same type or of differing types, may be present and connected such that the wastewater passes to and through them sequentially as it is treated and/or processed. The remaining components of the wastewater treatment mixing system 1 of the present invention are show ore detail in additional figures and described therewith.

Figure 2:
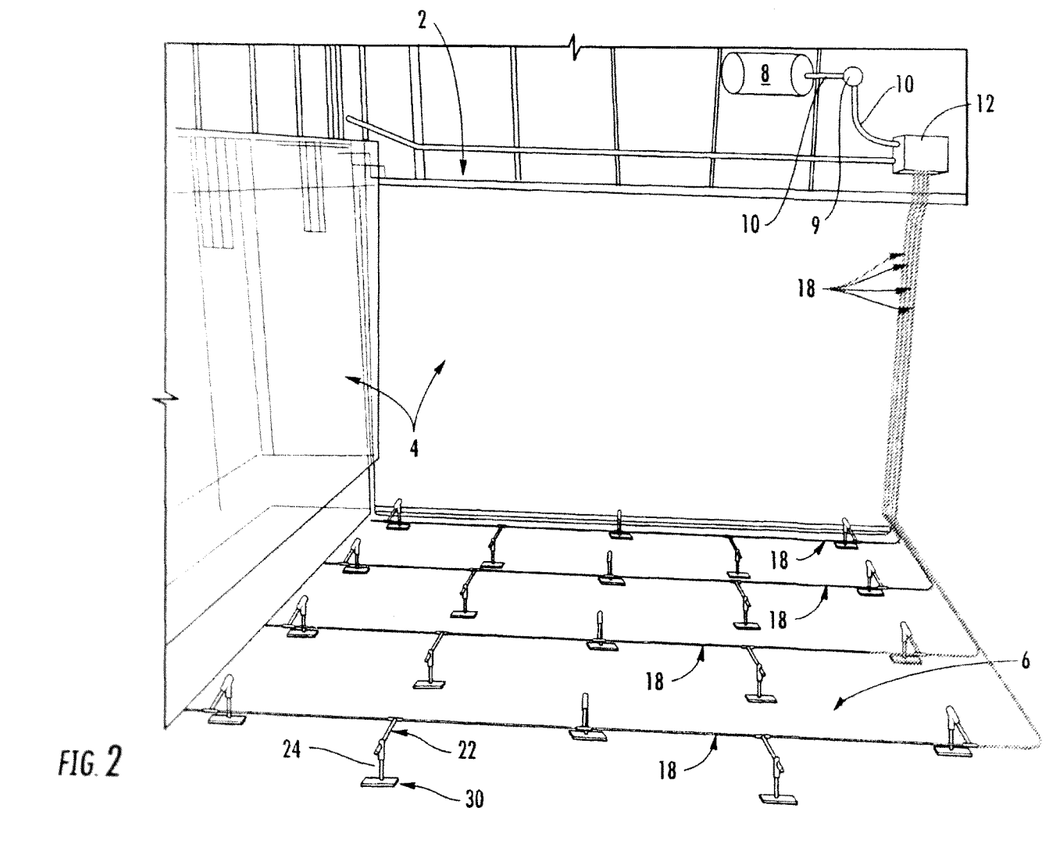
FIG. 2 is a partial perspective view of the mixing system shown FIG. 1.

FIG. 2 is a partial perspective view of the mixing system shown FIG. 1. As shown in FIG. 2, a source of compressed air is shown outside of basin 2 as a compressor 8. Compressor 8 is connected to supply line 10, which feeds into a controller box 12. A conventional regulator 9 may be placed along the supply line to regulate the pressure of pressurized gas from the compressor 8. In the depicted embodiment, controller box 12 is located outside of basin 2, but it is understood that the precise placement of controller box 12 may vary.

Figure 3:
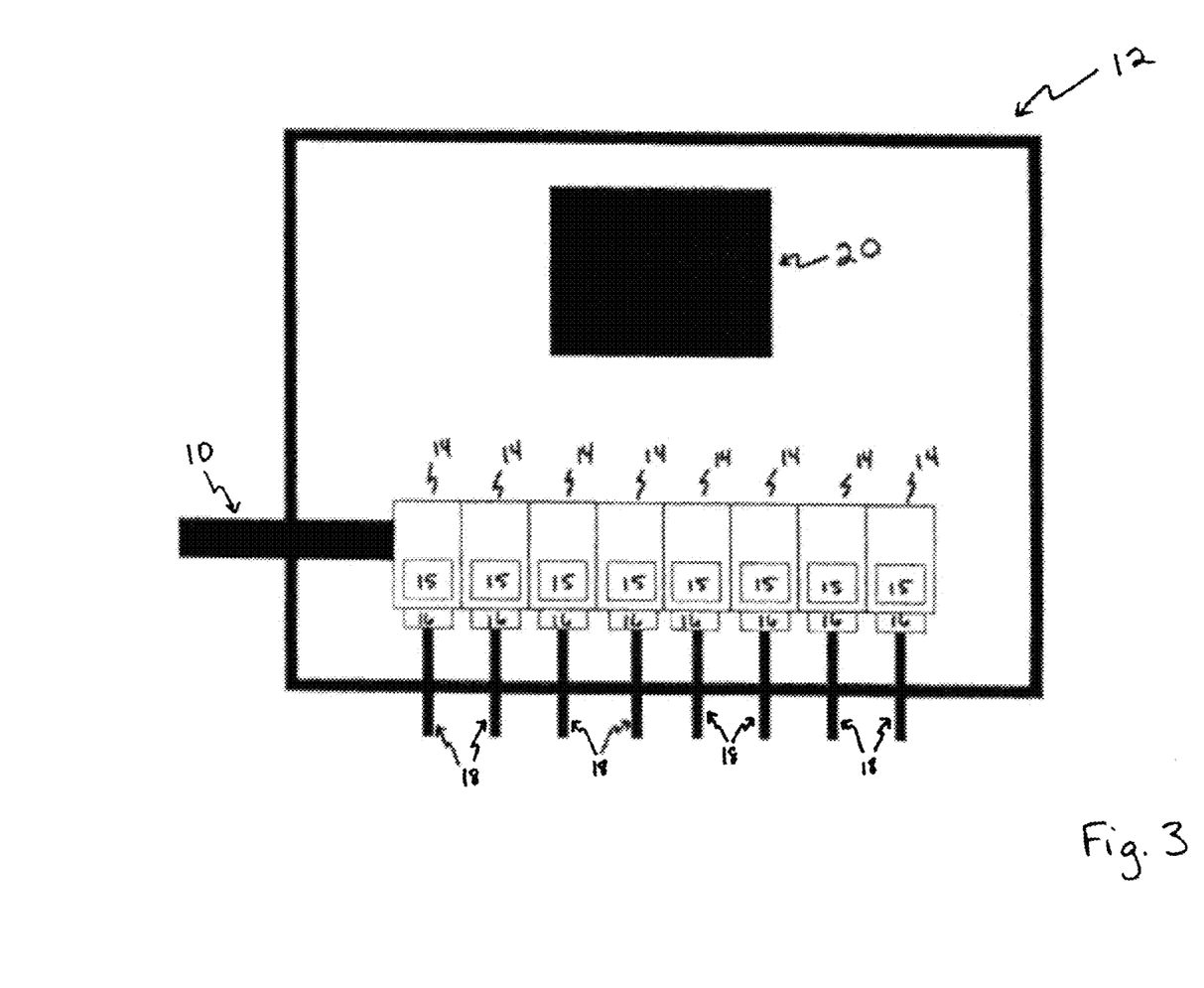
FIG. 3 is a front cutaway view, of a controller box in accordance with an embodiment of the present invention.

Controller box 12 is shown in further detail in FIG. 3, in which, in the particular embodiment depicted, controller box 12 includes eight valves 14 with each having a solenoid valve 16. Valves 14 are connected with supply line 10. Each valve 14 has an exhaust pressure sensor 15 that is in communication with a programmable logic controller 20. Each pressure sensor 15 provides a signal to the programmable logic controller 20 each time the valve 14 to which it is attached opens and closes. If the signals do not fall within a predetermined range, the programmable logic controller 20 generates a fault signal to the plant process control system (not shown) or to the operator. In this manner, mixing system 1 includes an alert for certain malfunctions, such as when a valve 14 is stuck open or stuck closed. The programmable logic controller 20, which can include a memory (not shown) and a processor (not shown), is also capable of selectively opening and closing each valve 14 located in controller box 12. Obviously, systems may also be utilized in the context of this invention that use manual manipulation of valves instead of the computerized control system described above.

Referring again to FIG. 2, four supply headers 18 made of PVC piping are shown, wherein each supply header 18 is connected to a valve 14 in controller box 12. Supply headers 18 extend from controller box 12 toward bottom 6 of basin 2. Supply headers 18 also extend in a pattern parallel with bottom 6 in an arrangement in which they are at substantially equally-spaced intervals. As apparent to an ordinary artisan, supply headers 18 can be made of a single, continuous component or, in an alternative embodiment, supply headers 18 can be constructed from multiple components joined by conventional measures, such as welding, adhesive, threading, bending, use of a connector, or other known measures or combinations thereof. In addition, the headers, as well as all of the piping in this system, can be of any construction and material that meets the particular needs of the mixing system. For example, the piping can be made from plastic, galvanized steel, or any other material from which piping is typically formed and which meets the requirements of the particular system. It should also be appreciated that in other embodiments, the location of supply headers 18 can be varied. By way of example, headers 18 can run above basin 2.

Figure 4:
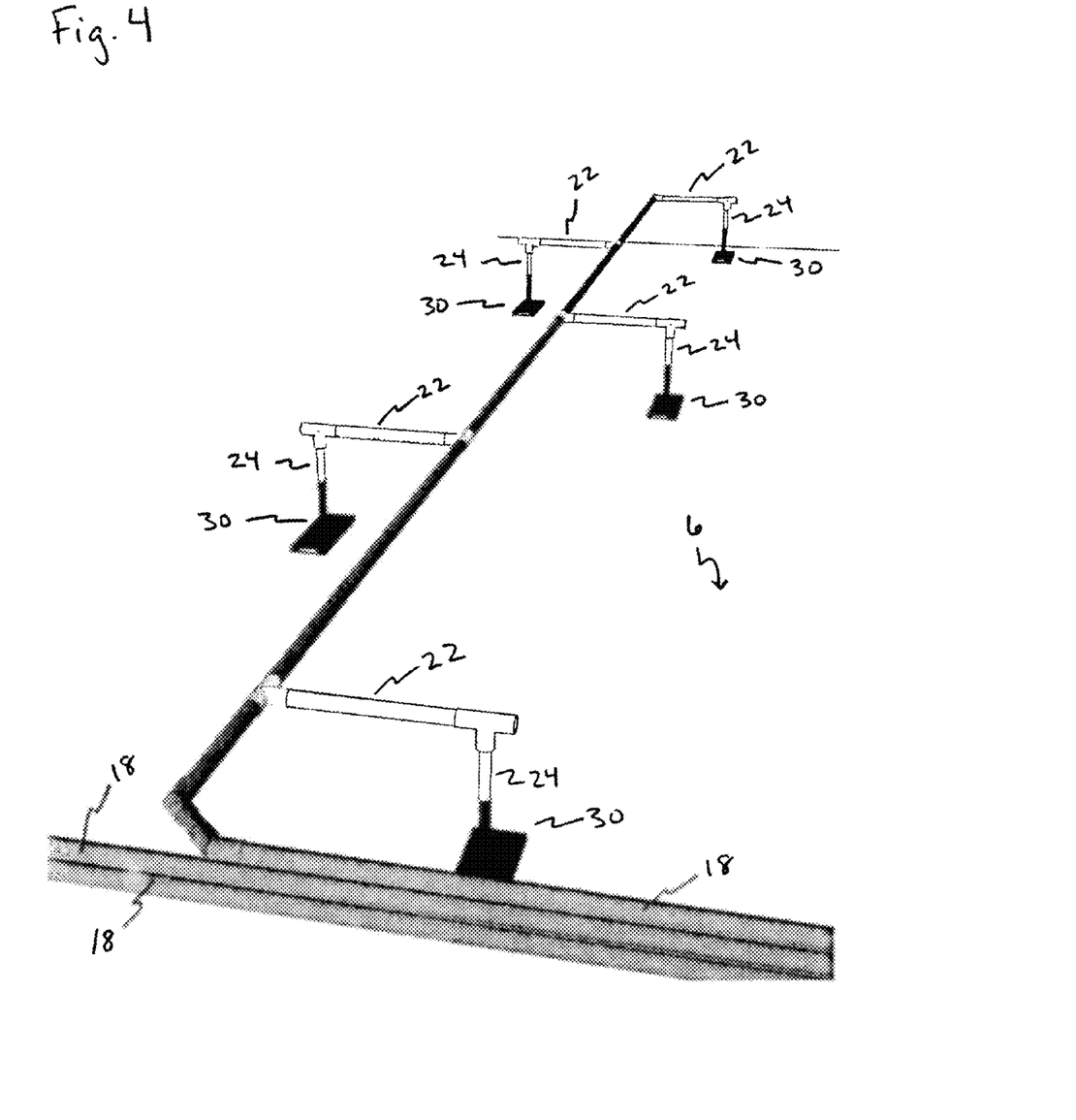
FIG. 4 is a detailed view of a supply header of the present invention having five nozzles, wherein each nozzle is connected to the supply header by way of a first line and a second line.
Figure 5:
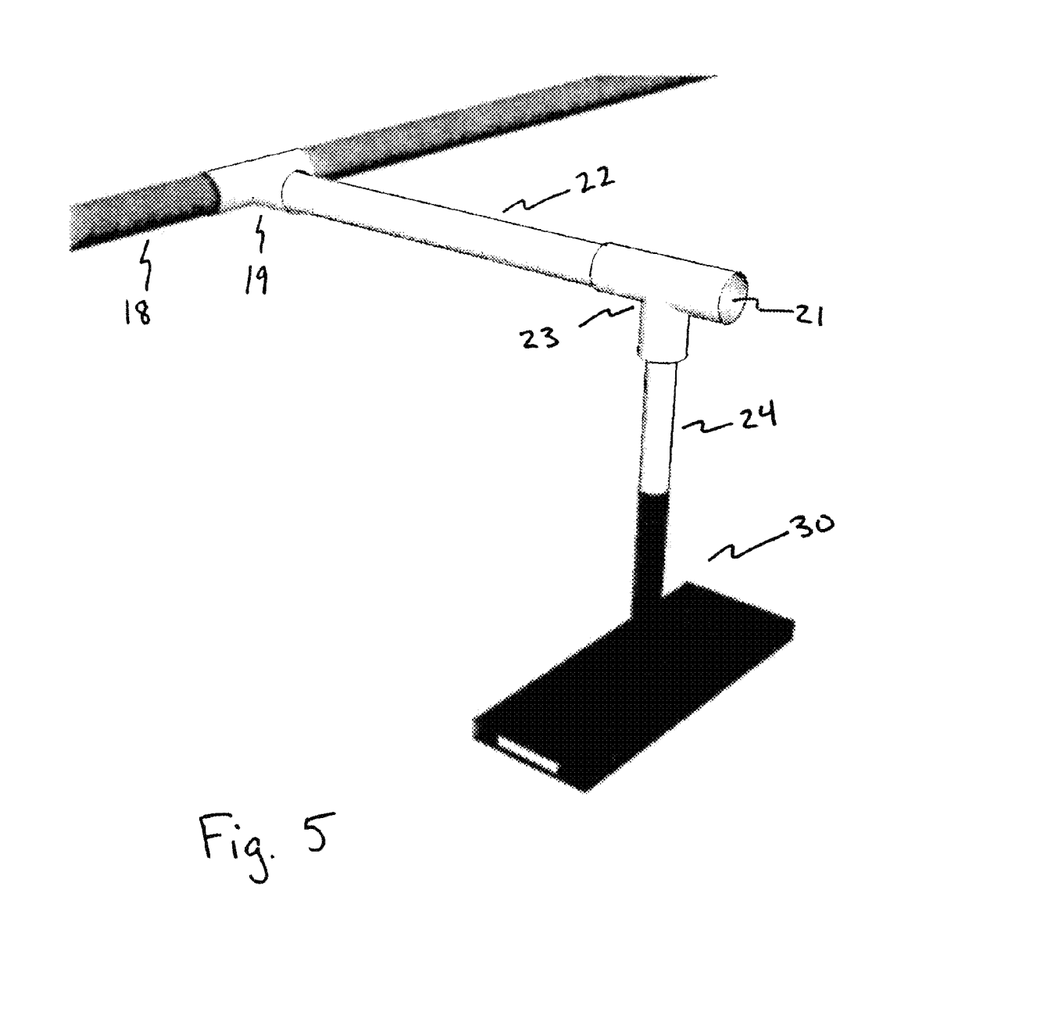
FIG. 5 is a close-up view of a nozzle from FIG. 4 that is connected to the supply header by way of a first line and a second line.

In the embodiment depicted in FIG. 2, and as also shown in more detail in FIG. 4, each of the supply headers 18 has five first lines 22 that extend substantially perpendicular from each supply header 18 and that are substantially parallel to bottom 6. It is understood that first lines 22 can extend at different angles in other embodiments. As seen in FIG. 5, first lines 22 are connected to supply header 18 using a T-type connector 19 with cap 21 sealing the unconnected branch, although any conventional means for connecting can be employed and such means are readily known to a person having ordinary skill in the art. Alternatively, for example, supply header 18 can be integral to first line 22. Although first lines 22 are depicted in a staggered layout, i.e. each first line 22 extends in the opposite direction from the previous and subsequent first lines 22, other layouts are within the scope of the present invention. Although, certain advantages may be achieved with the particular layout depicted in the figures hereof.

Attached to each first line 22 is a second line 24, which extends in the same general direction as sidewalls 4. As shown FIGS. 2, 4, and 5, each second line 24 is connected to a nozzle 30 at the distal end of second line 24 opposite the supply header 18. The connection between second line 24 and nozzle 30 can be made by any conventional measures, such as those discussed above. It is understood that in other embodiments, the second line 24 can extend at different angles. In the depicted embodiment, as best shown by FIG. 5, first line 22 and second line 24 are connected using a T-type connector 23 and are generally at a 90° angle with respect to one another. In FIG. 5, nozzle 30 is shown in black shading.

Figure 6A:
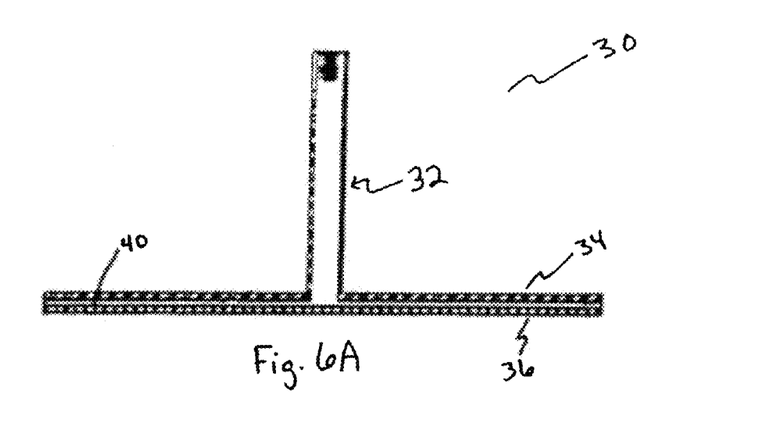
FIG. 6A is a front, cut-away view of an embodiment of a nozzle of the present invention in which the spacers (shown if FIG. 6B) are omitted for clarity.
Figures 6B, 6C:
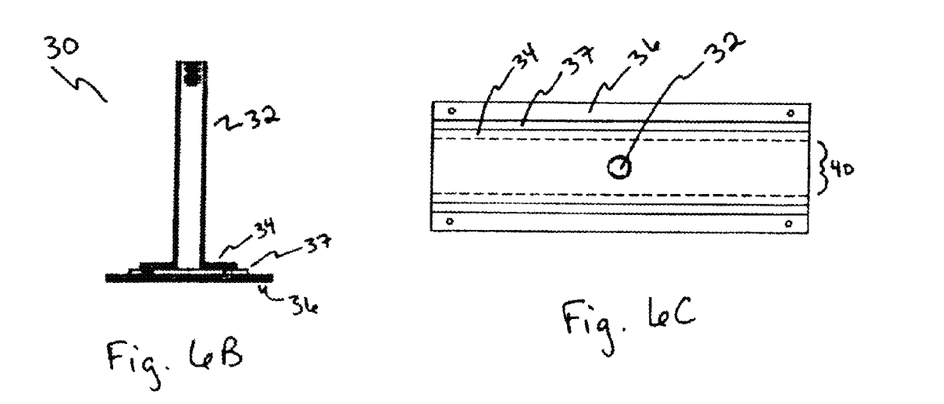
FIG. 6B is an end view of the nozzle shown in FIG. 6A.
FIG. 6C is a top view of the nozzle depicted in FIG. 6A.

Although one of ordinary skill in the art will appreciate that various types of nozzles can be used within the scope of the present invention, a particular embodiment of the present invention is shown in detail in FIGS. 6A, 6B, and 6C. With reference to these figures, nozzle 30 has a nipple 32, an upper plate 34, a lower plate 36, and spacer 37. Spacer 37 is omitted from FIG. 6A for clarity. Nipple 32, which is hollow to permit gas flow, is connected to second line 24 (as shown in FIG. 5) and opens into channel 38. Upper plate 34 and lower plate 36 are parallel to each other and are spaced apart by spacer 37 such that channel 38 is formed between them, wherein channel 38 has outlets 40 at each distal end. In other embodiments, multiple channels are present, wherein each channel may have an outlet at each distal end. By way of example, one embodiment of a nozzle of the present invention has a nipple that connects with three channels, wherein each channel has an outlet at each distal end.

In other embodiments, channel 38 can be formed by two plates being directly attached without a spacer wherein the plates have integral grooves that align to form a channel. In yet further embodiments, the nozzle may be interconnected to a tube or pipe, wherein the hollow interior of the tube or pipe functions as channel 38. It is recognized that one of ordinary skill in the art will readily appreciate other structures suitable to provide for channel 38. In an additional embodiment, the channel is formed by a single plate having a groove, wherein the plate is located against the bottom of a containment unit such that the groove and bottom collectively form a channel. In one particular embodiment of the present invention, the inner diameter of the nipple 32 measures one inch and the length measures nine inches; the upper plate is twenty inches long by four inches wide by 0.25 inches thick; the lower plate is twenty inches long by seven inches wide by 0.25 inches thick; the spacers are twenty inches long by two inches wide by 0.125 inches thick; and channel 38 and outlets 40 have a height (between upper plate 34 and lower plate 36) of 0.25 inches and a width of three inches. In another embodiment, the lower plate is alternatively ten inches wide. In yet another embodiment, the spacers are one inch wide.

In some embodiments, the dimensions of the channels and outlets on a nozzle are designed as a function of the number of outlets on the nozzle. For instance, and by way of example, nozzles having more outlets may have narrower channels and outlets than an otherwise identical nozzle having fewer outlets. Similarly, it will be appreciated that the length of a channel can influence the design dimensions of its channel and outlet. In addition, in some embodiments, outlets on a nozzle may be spaced such that adjacent outlets are no closer than the width of the outlets.

In operation, wastewater treatment mixing system 1 functions to the contents of basin 2. System 1 operates by compressor 8 providing pressurized gas into supply line 10. A conventional regulator may be utilized to control the pressure of the pressurized gas. The pressurized gas is generally a gas or fluid that has a lower density than the wastewater mixture (including any added compounds) that is present in basin 2. The pressurized gas flows through supply line 10 to the valves 14 in controller box 12. Each valve 14 is capable of opening and closing to selectively and controllably allow the pressurized gas to flow into the supply header 18 corresponding to that particular valve 14. When a valve 14 is opened, the pressurized gas flows into the respective header 18 for that valve. In one embodiment, the opening and closing of the valve can be controlled by the programmable logic controller 20. In others, the opening and closing of the valve(s) can be controlled manually.

Figure 7:
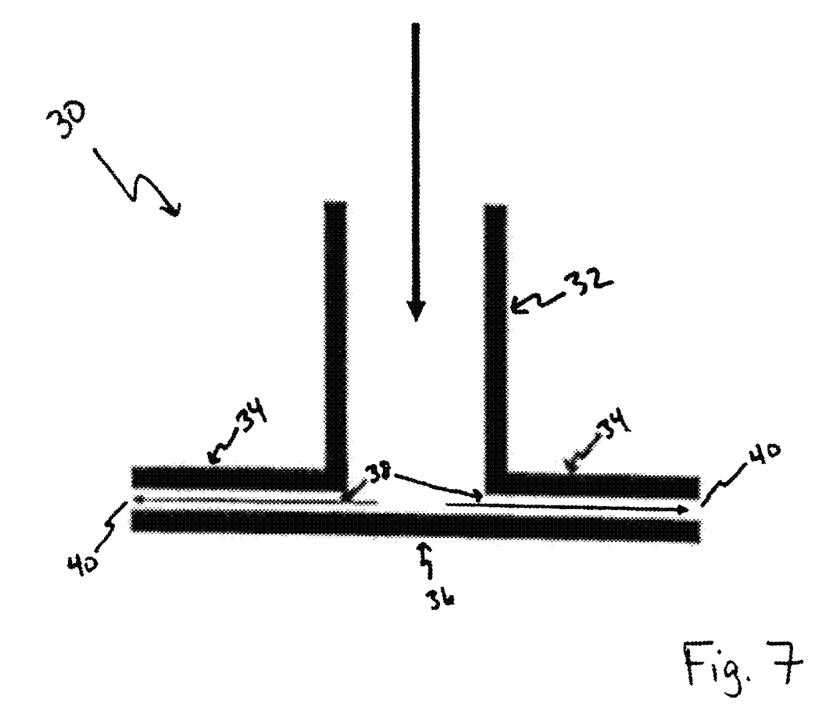
FIG. 7 is a drawing showing the flow of gas into and out of the nozzle depicted in FIG. 6A.

In one embodiment, no more than one valve 14 within control box 12 is open at any given time. When a valve 14 is open, the pressurized gas flows into and through a header 18 corresponding with that particular valve 14. As sufficient pressurized gas flows into header 18, it will also fill first line 22 and second line 24. The gas flow continues into nozzle 30. The flow of gas in nozzle 30 of FIG. 6 is shown by arrows in FIG. 7. As shown, the gas flows into nozzle 30 by entering nipple 32 and then continues to channel 38 and toward outlets 40. In general operation, valves 14 are opened in short, cyclic intervals.

Figure 8:
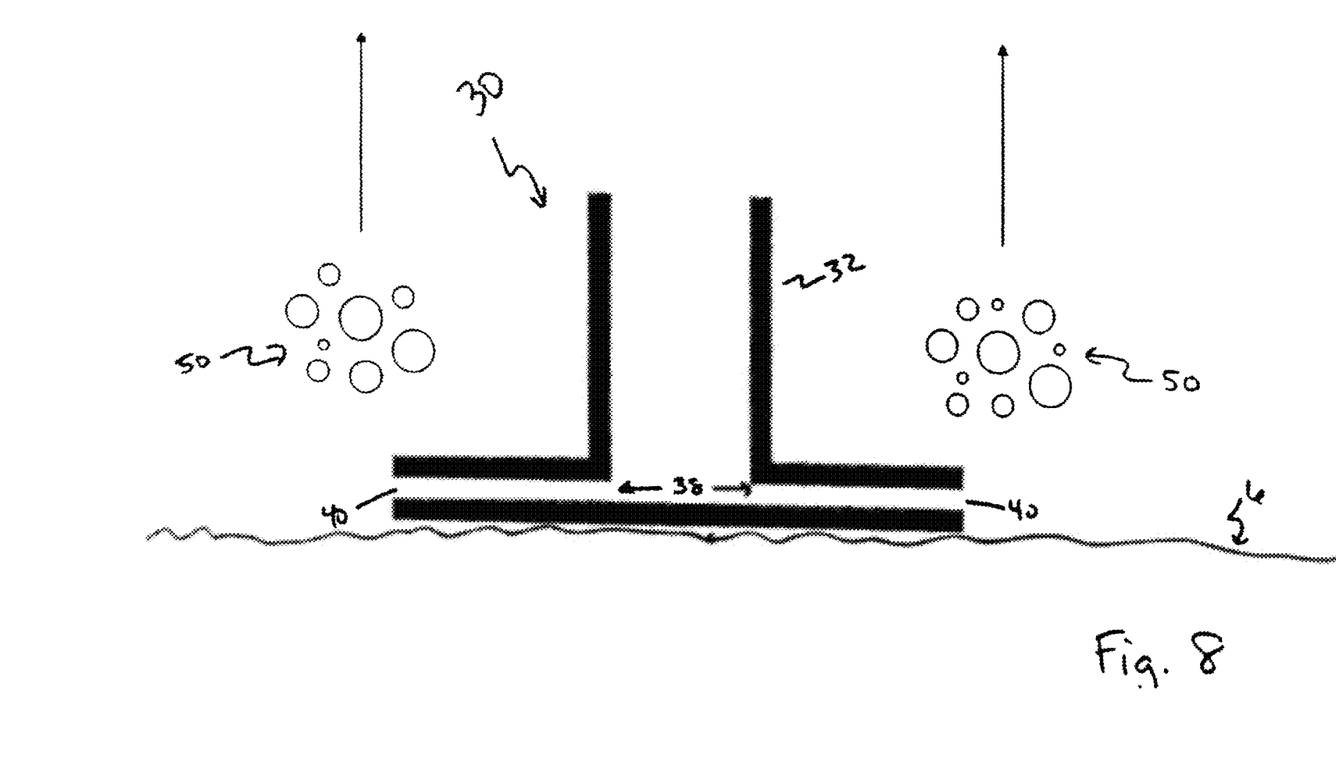
FIG. 8 is a side view of the nozzle shown in FIG. 5 showing rising mixing bubbles.

As a result of the bursts of gas exiting nozzle 30 through outlets 40 and entering basin 2, nozzle 30 generates a plurality of mixing bubbles 50 in basin 2 that are generally larger in size than the bubbles introduced to the system by conventional aerators used in an aeration process for treating wastewater. Some wastewater processes utilize diffusers that generate small bubbles and the diffusers are not operated in a generally cyclical interval. In the present intervention, nozzle 30 is used to introduce cyclic, controlled bursts of compressed gas or other fluid to the contents of basin 2 as shown in FIG. 8. The bubbles created by the present invention may be generally repeatable at distinct intervals as desired by the particular fluid mixing flow desired.

Mixing bubbles 50 may vary in size, and various parameters may influence the size of the mixing bubbles, such as the size of channel 38 and outlets 40, the flow rate of the pressurized gas, and the density of the pressurized gas. Generally, when similar supply headers, lines, and nozzles are used throughout a system, mixing bubbles of generally the same volume and size will be formed by each nozzle in the system when operating under similar conditions. Mixing bubbles 50 are generally larger than bubbles created by conventional aerators used in aeration processes for treating wastewater. However, in one embodiment of the present invention, none of mixing bubbles 50 exceed a diameter of six inches. Because the pressurized gas forming mixing bubbles 50 is less dense than the surrounding liquid composition in basin 2, mixing bubbles 50 rise away from bottom 6 of basin 2 as shown by the arrows in FIG. 8. It should be noted that the mixing bubbles shown in FIG. 8 and all subsequent figures are representative only and are not to scale. The mixing bubbles of the present invention may vary in quantity and size from the depicted representations and their physical characteristics are dependent on a variety of factors as mentioned above.

As mixing bubbles 50 rise, a displacement of the adjacent fluid within basin 2 occurs. In particular, the rising mixing bubbles 50 exert a force in an upward direction, and a vacuum is created behind the bubbles. This vacuum can be present behind individual bubbles and can also be present from a grouping of mixing bubbles 50 resulting from a gas burst. The vacuum pulls surrounding fluid from the area around bottom 6 of basin 2 toward the surface (in the direction of the rising mixing bubbles 50).

The cumulative effect of the periodic release of mixing bubbles 50 is the generation of at least one circular pathway of liquid within the containment unit. As used herein, the term "circular pathway" indicates that near the surface of the liquid level there is a downwardly directed circulation pathway of the fluid.

Figure 9:
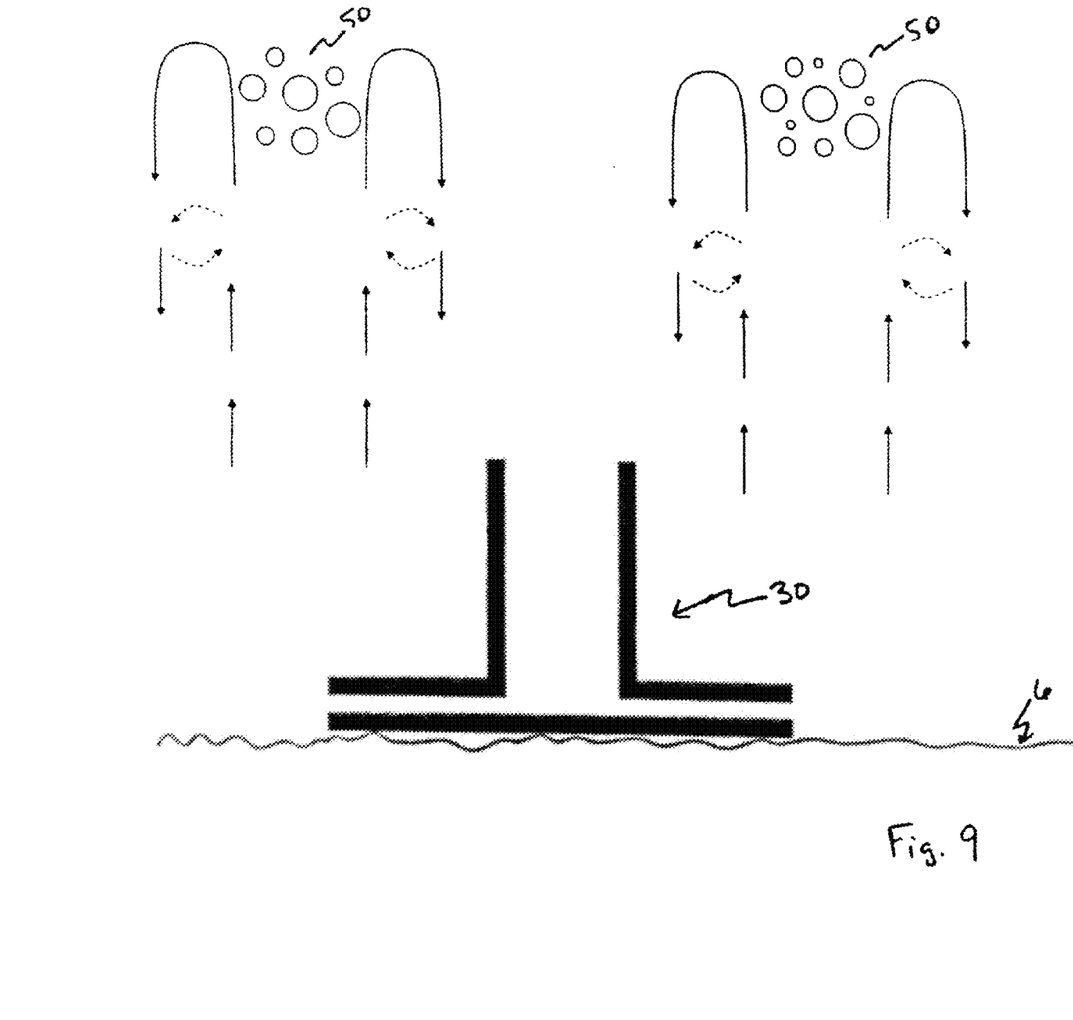
FIG. 9 is a drawing that provides a representation of pathways created by the mixing system of the present invention.

An example of a possible circular pathway created by the rising mixing bubbles 50 and the trailing vacuum created thereby is depicted by the arrows in FIG. 9. As shown in FIG. 9, mixing bubbles 50 have risen away from bottom 6 of basin 2. As a result, a circular pathway shown by the non-dashed arrows is created. In addition, the dashed arrows in FIG. 9 show an additional pathway that can be created by the rising of the bubbles and the vacuums associated therewith. It is understood that these pathways are representative only, and a person of ordinary skill in the art can readily appreciate that additional, alternative, and different pathways can be created by the present invention.

The periodic bursts of pressurized gas from nozzles 30 as described above can be controlled and varied in terms of both timing and volume to achieve a desired circulation pathway. In particular, particular valves 14 can be selectively opened and closed to permit a desired amount of pressurized gas to enter into a particular supply header 18. By controlling the pressurized gas entering each supply header 18, the resulting burst is also controlled. In a like manner, a desired sequence of bursts from nozzles 30 in communication with different supply headers 18 can be achieved by controlling the sequence of pressurized gas entering supply headers 18. For instance, in one embodiment the sequence of pressurized gas releases may be timed to move along the basin in the direction of wastewater flow before the pattern is cyclically repeated to create a wavelike effect.

In some embodiments of the present system, first lines 22 and second lines 24 have an equal inner diameter that is smaller than the inner diameter of supply header 18 to which they are in communication. In other embodiments, first lines 22 have an inner diameter equal to the inner diameter of the supply header 18 to which it is connected, and the corresponding second lines 24 has a smaller inner diameter. In such an embodiment, supply header 18 and first lines 22 fill with the pressurized gas before pressurized gas enters any adjoining second lines 24. This flow pattern of pressurized gas results from the wider diameter supply header 18 and first line 22 offering a lesser path of resistance to the pressurized gas than the smaller diameter of second line 24. In such an embodiment, after supply header 18 and first line 22 have filled with pressurized gas, each second line 24 connected to that header begins to simultaneously fill with pressurized gas that then flows into the connected nozzles 30 at the same rate. In this manner, the pressurized gas entering each nozzle 30 is controlled so that the resulting burst described above occurs simultaneously and of equal magnitude for each nozzle 30 in communication with the same header 18. In even further embodiments, first line 22 has a smaller inner diameter than supply header 18 to which it is connected, and the corresponding second line 24 has a smaller inner diameter than the second line 24. It is appreciated that the use of vertical line between the supply header and nozzle is useful to prevent fluids from the containment unit entering the lines or supply header.

In yet another embodiment, the system may not include a first line 22, and second line 24 may connect to supply header 18. In such an embodiment, second line 24 may also have a smaller inner dinner than supply header 18 to permit equal flow of the pressurized gas in each second line 24 and to each nozzle 30 as described above. As indicated, second line 24 may be a vertical pipe or line extending from first line 22. However, if improvements can be made to achieve the results of the present invention without the use of a vertical pipe, those are within the scope of this invention.

The system of the current invention includes nozzles in a variety of patterns within a containment unit. As shown in the exemplary embodiment shown in FIGS. 1-2, nozzles 30 are displaced throughout basin 2 in a grid pattern, with five nozzles in communication with each supply header by way of a second line 24 and a first line 22, and the nozzles are shown in a staggered pattern. In other embodiments, more or fewer nozzles can be in communication with a header. In yet other embodiments, the arrangement of the nozzles can vary, including being on the same side of a supply header (as opposed to staggered). In addition, in even further embodiments, the supply header may be of a circular shape or serpentine shape as opposed to the linear grid depicted in FIG. 1. The particular arrangement of a mixing system of the present invention can depend upon the size of a containment unit and the particular process being performed, and additional and alternative arrangements are appreciated by a person having ordinary skill in the art. In some embodiments, the nozzles may be placed approximately five to ten feet longitudinally along a supply header and offset approximately one to four feet from the header.

As shown in the embodiment in FIGS. 1-2 and 3-5, nozzles 30 are located on the bottom of the basin. In some embodiments, nozzles 30 can be attached to the bottom 6 of basin 2. In yet other embodiments, nozzles 30 are placed above the bottom 6 of basin 2.

The present invention has numerous applications. For instance, in a wastewater treatment stem, the present invention can increase contact between the wastewater, chemical additives, gas additives, and the working bacteria in the containment unit. By way of example, and without intending to limit the scope of the invention, the present invention can be used in an aerobic process for treating wastewater. In such an aerobic process, conventional aerators or diffusers are placed on or near the bottom of a containment unit. The aerators introduce diffused oxygen into the containment unit, thereby generating small bubbles. An aerobic process also generally includes bacteria and other microorganisms in the wastewater. The oxygen, bacteria, and other microorganisms convert ammonium in the wastewater to nitrate via nitrite, and an anoxic process can then be used to convert the nitrate to an environmentally-harmless nitrogen gas.

To improve the conversion of the ammonium, mixing within the containment unit of the components may be desired. Whereas aeration bubbles may cause some limited mixing, the influence of the aeration bubbles on the surrounding fluid is limited and only produces a significant effect in the area immediately surrounding the diffuser. Using the system and process described above, improved mixing can be achieved in the aerobic process. In particular, the present invention can provide turbulent displacement of the liquid, gases, bacteria, and microorganisms in the containment unit and thereby beneficially increase the contact of the components. In addition, increased retention time of other gases in the system may be achieved.

Figure 10:
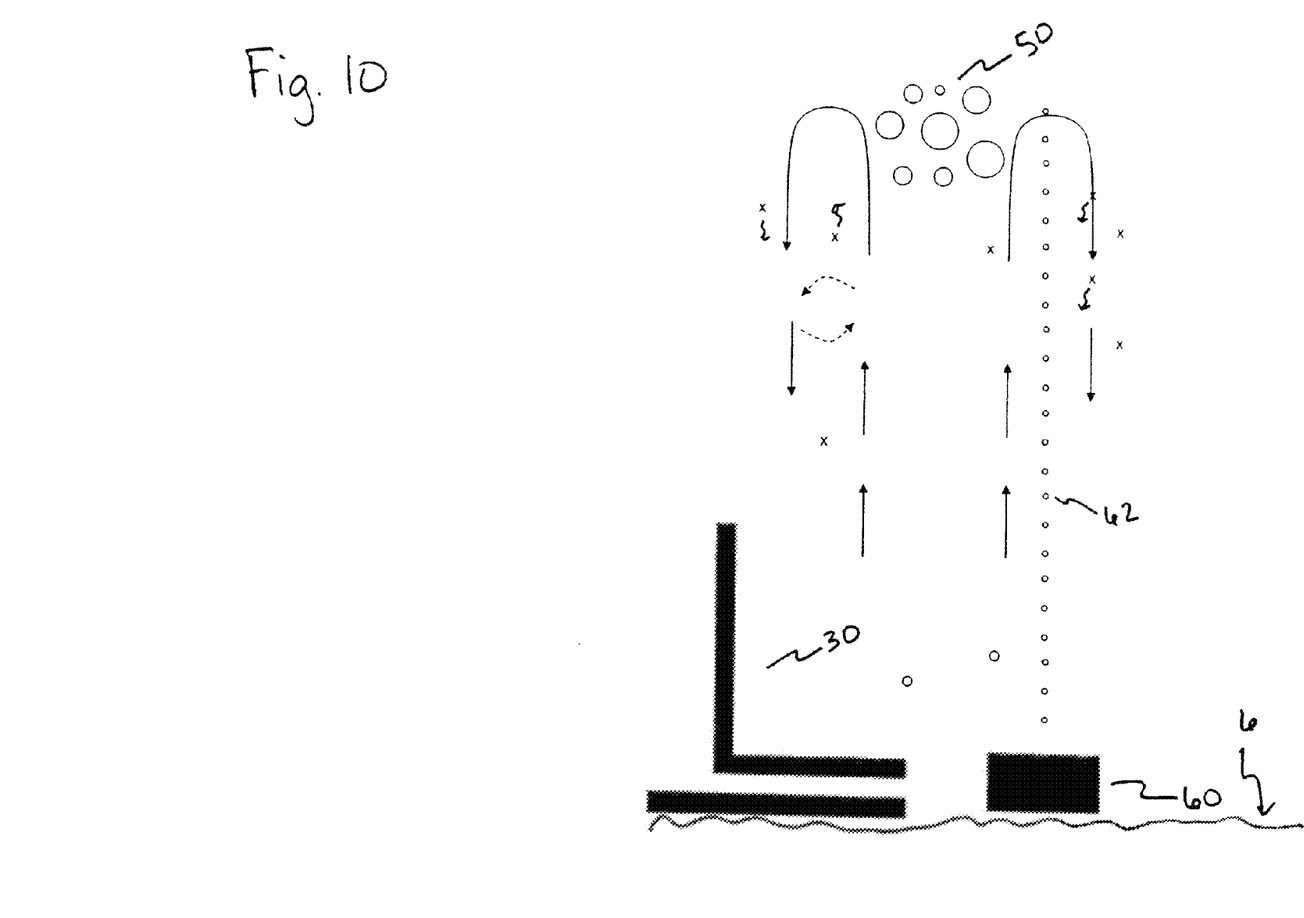
FIG. 10 is a drawing depicting an embodiment of a mixing method of the present invention in an aerobic wastewater treatment process.

This above-described application of the present invention in an aerobic wastewater treatment process is illustrated further by FIG. 10, in which only a portion of a nozzle and segment of the containment unit are represented. The "x" designations in FIG. 10 are representative of bacteria and microorganisms present in the fluid within the containment unit. Aerator 60, which is more typical of a wastewater unit diffuser, generates diffused oxygen bubbles 62. Mixing bubbles 50 in FIG. 10 are shown as having already risen away from the bottom 6 of basin 2, and the resulting pathways shown by the arrows are generated as described above. The bacteria and microorganisms can be turbulently mixed (as represented by wobbling arrows) by the pathways created by the system of the present invention as described above, thereby increasing the contact between the components in the containment unit. A person having ordinary skill in the art will appreciate the representative nature of FIG. 10 as an example only and recognize that additional mixing can occur than represented by the arrows.

In a similar manner, the present invention can be used to improve mixing in an anoxic wastewater treatment process. As described above, the present invention can be used to increase contact between the wastewater, bacteria, and microorganisms in such a process. In particular, because anoxic processes operate in the absence of dissolved oxygen, the minimal mixing provided by aerators in an aerobic process is not present and the present invention is advantageous.

As indicated above, a person having ordinary skill in the art will appreciate that the present invention may also be used in other processes and systems. For instance, and without limitation, the present invention may be used in sludge digesters, anaerobic wastewater treatment containment units, wastewater channels, sludge holding tanks, equalization tanks, and pump stations in the same manner described above with any deviations being readily known by a person having skill in the art.

In addition, the present invention can be used in conjunction with other conventional structures or components. For instance, the system and nozzle of the present invention can be used in conjunction with one or more mechanical mixers. In addition, the present invention can be used in conjunction with an Integrated Fixed-film Activating Sludge ("IFAS") system that includes media. Such media are suspended in the wastewater and provide bacteria and other microorganisms a structure on which to attach. Likewise, a knitted matrix fixed-film media, such as the commercially available BioWeb™ product sold by Entex Technologies, can be used in conjunction with the present invention to provide points of attachment for biomass growth. An anchored net, web, or similar structure that may provide another structure upon which the bacteria and other microorganisms can attach can be used in conjunction with the present invention. In some embodiments, any combination of these additional components can be employed, such as both an IFAS and a net, web, or similar structure.

The present invention is understood to achieve mixing that is equivalent to or better than that which is achieved using known mechanical mixers. For instance, a test was conducted in which the efficiency of a nozzle of the present invention was used and compared with a mechanical mixer commercially sold under the brand name Flygt S4660. In the test, Rhodamine WT, a known chemical tracer with the ability to absorb green light and emit red light, was added to a composition that was mixed in a basin. The basin in which the test was conducted had dimensions of 55 ft×41.5 ft×24 ft, resulting in a total volume of 409,754 ft$^3$.

In one trial, the present invention was tested in an embodiment having four headers, wherein each header was in communication with a four nozzles by way of a first line and a second line. As described above, a separate valve was in communication with each header to selectively permit compressed gas to enter each header. Compressed air at 30 psi was selectively and consecutively fed into each header for 0.5 seconds, with a total of 5.5 seconds elapsing between the pressurized gas entering each header. Thus, each valve was opened for 0.5 seconds every 24 seconds to permit the compressed air to flow into the header corresponding to that valve. In a separate trial, a single commercially available 15 horsepower mechanical mixer sold under the brand name Flygt was used in the same basin.

Figure 11:
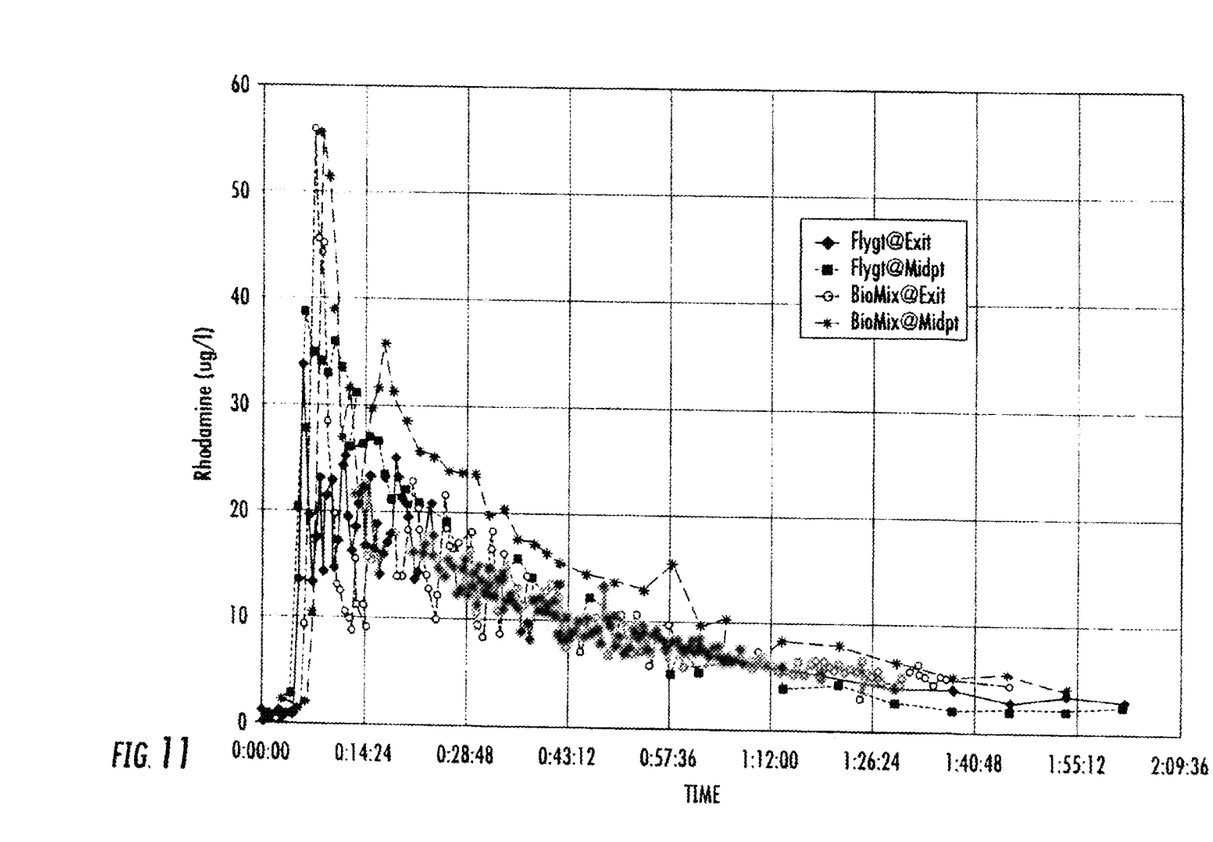
FIG. 11 is a graph comparing mixing test results of the present invention with mixing test results of a conventional mechanical mixer.

A meter was used to measure the concentration of Rhodamine WT at a point near the exit of the basin, and samples were taken at a central point in the basin and the Rhodamine WT was measured. As shown in FIG. 11, in which the concentration of the Rhodamine WT is compared over the time of mixing for both the present invention and the tested mechanical mixer, the present invention generally mixed as well as the mechanical mixer. The present invention is indicated in the legend of FIG. 11 as "BioMix," and the mechanical mixer is indicated at "Flygt." In particular, the graph shows that the concentration of the Rhodamine WT is comparably mixed by the present invention as compared with the tested mechanical mixer.

In addition, the test described above further indicates that the nozzle of the present invention mixed in a more energy-efficient manner. In particular, the following parameters applied respectively to each trial:

|  | Present Invention | Mechanical Mixer |
|---|---|---|
| Power Factor | 0.91 | 0.55 |
| Amps | 6.80 | 22.00 |
| Volts | 483.07 | 467.65 |

Using the parameters above, the horsepower and kilowatts required to obtain the results shown in FIG. 11 can be calculated using the following equations, in which "p.f." represents the power factor:

$$HP = \frac{Amps * volts * \sqrt{3} * p.f.}{746}$$

$$kW = \frac{Amps * volts * \sqrt{3} * p.f.}{1000}$$

Using this equation, the present invention required only 6.91 horsepower and 5.155 kW, whereas the mechanical mixer required 13.14 horsepower and 9.801 kW to achieve comparable mixing results. These results indicate that the nozzle of the present invention operated 190% more efficiently than the conventional mixer. Assuming an electricity cost of $0.06 per kilowatt hour and 8760 hours per year of operating the compressor, the present invention represents a savings of $2442.08 per year to achieve comparable in mixing in the containment unit tested. In addition, the present invention does not require mechanical or electrical components to be present within the containment unit, but instead utilizes compressed air.

The foregoing description of illustrative embodiments of the invention has been presented only for the purpose of illustration and description and is not intended to be exhaustive or to limit the invention to the precise forms disclosed. Numerous modifications and adaptations thereof will be apparent to those of ordinary skill in the art without departing from the scope of the present invention.

It will be understood that each of the elements described above, or two or more together, may also find utility in applications differing from the types described. While the invention has been illustrated and described in the general context of mixing in wastewater treatment systems and processes, it is not intended to be limited to the details shown since various modifications and substitutions can be made without departing in any way from the spirit and scope of the present invention. As such, further modifications and equivalents of the invention herein disclosed may occur to persons skilled in the art using no more than routine experimentation, and all such modifications and equivalents are believed to be within the spirit and scope of the invention as described herein.

We claim:

1. A process for mixing in a wastewater treatment system comprising simultaneously introducing at least two intermittent bursts of pressurized gas from a nozzle and into a containment unit in a wastewater treatment system, wherein the at least two intermittent bursts of pressurized gas are introduced into the containment unit simultaneously from opposing distal ends of a fluid passage of the nozzle.

2. The process of claim 1 wherein the at least two intermittent bursts of pressurized gas are introduced at or near the bottom of the containment unit.

3. The process of claim 1 wherein the containment unit comprises wastewater disposed therein.

4. The process of claim 1 wherein the process comprises simultaneously introducing at least two intermittent bursts of pressurized gas from a second nozzle.

5. The process of claim 4 wherein the at least two intermittent bursts of pressurized gas from the nozzle and the at least two intermittent bursts of pressurized gas from the second nozzle are introduced substantially simultaneously.

6. The process of claim 4 wherein the at least two intermittent bursts of pressurized gas from the nozzle and the at least two intermittent bursts of pressurized gas from the second nozzle are introduced intermittently.

7. The process of claim 1 further comprising supplying pressurized gas to the nozzle through a header and a first line.

8. The process of claim 7 further comprising supplying pressurized gas to a second nozzle through a second header and introducing at least two intermittent bursts of pressurized gas to the containment unit from the second nozzle.

9. The process of claim 8 wherein the nozzle introduces at least two intermittent bursts of pressurized gas to the containment unit at a distinct interval from the intermittent bursts of pressurized gas from the second nozzle.

10. The process of claim 9 wherein the intermittent bursts of pressurized gas from the second nozzle is introduced cyclically with respect to the intermittent bursts of pressurized gas from the nozzle.

11. The process of claim 3 further comprising treating wastewater in the containment unit with an aerobic, anoxic, or anaerobic process.

12. The process of claim 7 further comprising supplying pressurized gas to the nozzle through a second line that is generally perpendicular to the first line, wherein the second line is located between the first line and the nozzle.

* * * * *